US010863674B2

(12) United States Patent
Faust et al.

(10) Patent No.: US 10,863,674 B2
(45) Date of Patent: Dec. 15, 2020

(54) TINE DEVICE FOR AN IMPELLER APPARATUS

(71) Applicant: Deere & Company, Moline, IL (US)

(72) Inventors: Jeremy J. Faust, Ottumwa, IA (US); Charles Scott Sloan, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 39 days.

(21) Appl. No.: 15/907,441

(22) Filed: Feb. 28, 2018

(65) Prior Publication Data

US 2019/0261567 A1    Aug. 29, 2019

(51) Int. Cl.
*A01D 57/28*      (2006.01)
*A01D 82/00*      (2006.01)
*A01D 34/535*     (2006.01)

(52) U.S. Cl.
CPC ........... *A01D 57/28* (2013.01); *A01D 34/535* (2013.01); *A01D 82/00* (2013.01)

(58) Field of Classification Search
CPC .... A01D 57/28; A01D 34/535; A01D 34/435; A01D 34/44; A01D 34/52; A01D 82/00; B02C 13/28; B02C 13/2804; B02C 2013/2812; A01F 12/40
See application file for complete search history.

(56) References Cited

U.S. PATENT DOCUMENTS

| | | | | |
|---|---|---|---|---|
| 2,841,946 A | * | 7/1958 | Sutherland | A01D 34/435 172/33 |
| 2,990,667 A | * | 7/1961 | Schwalm | A01D 34/435 56/12.7 |
| 3,027,702 A | * | 4/1962 | Phares | A01D 34/535 56/12.7 |
| 3,147,577 A | * | 9/1964 | Sutherland | A01D 34/535 56/504 |
| 3,222,854 A | * | 12/1965 | Barth | A01D 34/535 56/294 |
| 3,309,854 A | * | 3/1967 | Mitchell | A01D 34/535 56/294 |
| 3,335,555 A | * | 8/1967 | Woodring | A01D 34/535 56/294 |
| 3,411,279 A | * | 11/1968 | Woodring | A01D 34/535 56/294 |

(Continued)

FOREIGN PATENT DOCUMENTS

| | | | | |
|---|---|---|---|---|
| DE | | 1209790 B | 1/1966 | |
| DE | | 1215999 B | * 5/1966 | ........... A01D 34/535 |

(Continued)

OTHER PUBLICATIONS

European Search Report issued in counterpart application No. 19159987.7 dated Aug. 21, 2019. (8 pages).

*Primary Examiner* — Thomas B Will
*Assistant Examiner* — Joan D Misa

(57) ABSTRACT

A tine device for an impeller apparatus is disclosed. The tine device comprises at least one tine element having a first end configured to be rotatably coupled to a central rotor of the impeller apparatus. The tine element additionally comprises a second end positioned on a first side of a radial line extending through the first end, and a curved portion located on an opposite second side of the radial line between the first and second ends.

15 Claims, 6 Drawing Sheets

(56) References Cited

U.S. PATENT DOCUMENTS

| | | | | |
|---|---|---|---|---|
| 3,465,507 A | * | 9/1969 | Fishaw | A01D 34/535 56/294 |
| 3,505,800 A | * | 4/1970 | McCanse | A01D 34/535 56/12.7 |
| 3,527,038 A | * | 9/1970 | Wood | A01D 34/535 56/294 |
| 3,604,188 A | * | 9/1971 | Mott | A01D 34/535 56/294 |
| 3,606,748 A | * | 9/1971 | Middlesworth | A01D 34/535 56/294 |
| 3,657,869 A | * | 4/1972 | Ayranto | A01D 34/535 56/294 |
| 3,678,668 A | * | 7/1972 | Mott | A01D 34/535 56/294 |
| 3,678,671 A | * | 7/1972 | Scarnato | A01D 34/535 56/505 |
| 3,693,335 A | * | 9/1972 | Mathews | A01D 34/535 56/294 |
| 3,754,384 A | * | 8/1973 | Case | A01D 43/107 56/14.4 |
| 4,021,995 A | * | 5/1977 | Hill | A01D 34/52 56/1 |
| 4,077,192 A | * | 3/1978 | Klinner | A01D 43/08 56/16.4 R |
| 4,182,099 A | * | 1/1980 | Davis | A01D 43/102 56/16.4 R |
| 4,211,060 A | * | 7/1980 | Rhodes | A01D 34/535 56/12.7 |
| 4,905,460 A | * | 3/1990 | Toman | A01B 45/026 56/12.7 |
| 5,007,801 A | | 4/1991 | Hopfensperger et al. | |
| 5,272,861 A | * | 12/1993 | Roynberg | A01B 33/144 172/91 |
| 5,787,695 A | * | 8/1998 | Nishioka | A01D 34/435 56/15.1 |
| 6,478,674 B2 | * | 11/2002 | Redekop | A01F 12/40 460/112 |
| 6,511,374 B2 | * | 1/2003 | VanEe | A01F 12/40 460/112 |
| 6,640,605 B2 | | 11/2003 | Gitlin et al. | |
| 6,692,351 B2 | * | 2/2004 | Johnson | A01F 12/40 460/112 |
| 7,127,876 B2 | * | 10/2006 | Ligouy | A01D 43/10 56/16.4 R |
| 8,166,740 B2 | | 5/2012 | Eubanks et al. | |
| 2006/0213172 A1 | | 9/2006 | Beaufort et al. | |

FOREIGN PATENT DOCUMENTS

| | | |
|---|---|---|
| EP | 1723843 A1 | 11/2006 |
| FR | 2776953 A1 | 10/1999 |
| GB | 816422 A | 7/1959 |
| NL | 6601022 A | 7/1967 |

* cited by examiner

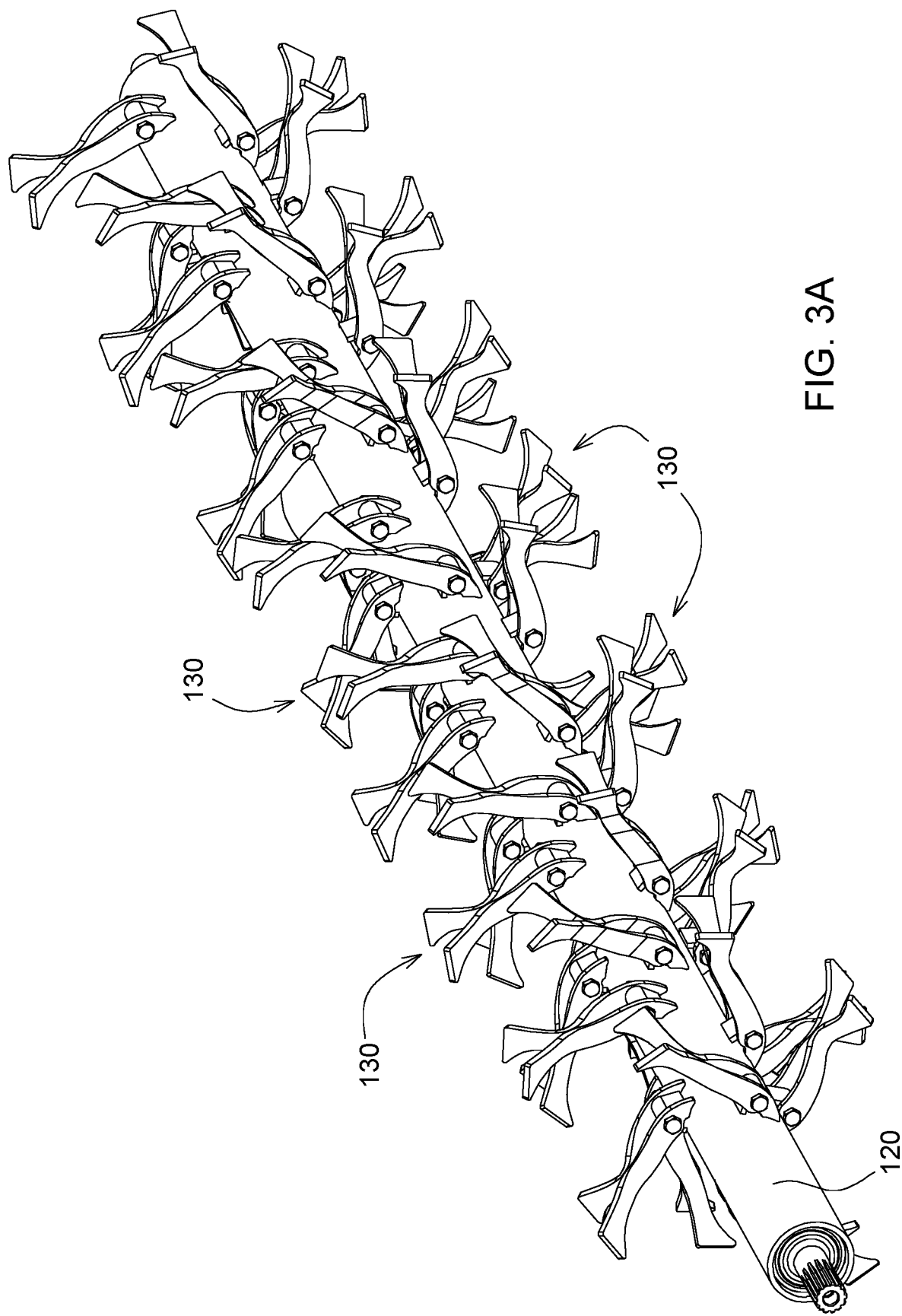

TINE DEVICE FOR AN IMPELLER APPARATUS

FIELD OF THE DISCLOSURE

The present disclosure relates generally to rotary impellers and, more particularly, to a tine device having a generally curved configuration that is designed for coupling to a rotor of an impeller apparatus.

BACKGROUND OF THE DISCLOSURE

Typically, an impeller conditioner is provided with an impeller mounted for rotation about a horizontal transverse axis, and with a hood which extends arcuately, from front to rear, about the impeller. The impeller includes a rotor defined by a central cylindrical core to which a plurality of tines are pivotally attached at various locations along, and about, the circumference of the rotor. These tines are mounted so that, as viewed from an end of the rotor, they extend generally radially from the axis of rotation of the rotor when the impeller is being driven, with the tines then being subjected to centrifugal force. Additionally, when conditioning crop with an impeller of the type discussed above, some crop does not release correctly for being guided by the shields for forming the crop windrow, but rather is carried over where it is released directly to the ground. The carried over crop that is deposited outside of the normal bounds of a windrow that would normally be formed by the forming shields results in non-uniform looking windrows and causes the crop to dry at different rates. As such, to address the above concerns, there is a need in the art for an improved tine device.

SUMMARY OF THE DISCLOSURE

According to an aspect of the present disclosure, a tine device for an impeller apparatus is disclosed. The tine device comprises at least one tine element having a first end configured to be rotatably coupled to a central rotor of the impeller apparatus. The tine element additionally comprises a second end positioned on a first side of a radial line extending through the first end, and a curved portion located on an opposite second side of the radial line between the first and second ends.

Other features and aspects will become apparent by consideration of the detailed description and accompanying drawings.

BRIEF DESCRIPTION OF THE DRAWINGS

The detailed description of the drawings refers to the accompanying figures in which:

FIG. 3A is a front perspective view of a impeller apparatus arranged in the mower-conditioner header of FIG. 1 according to an embodiment.

DETAILED DESCRIPTION OF THE DRAWINGS

Figure 1:
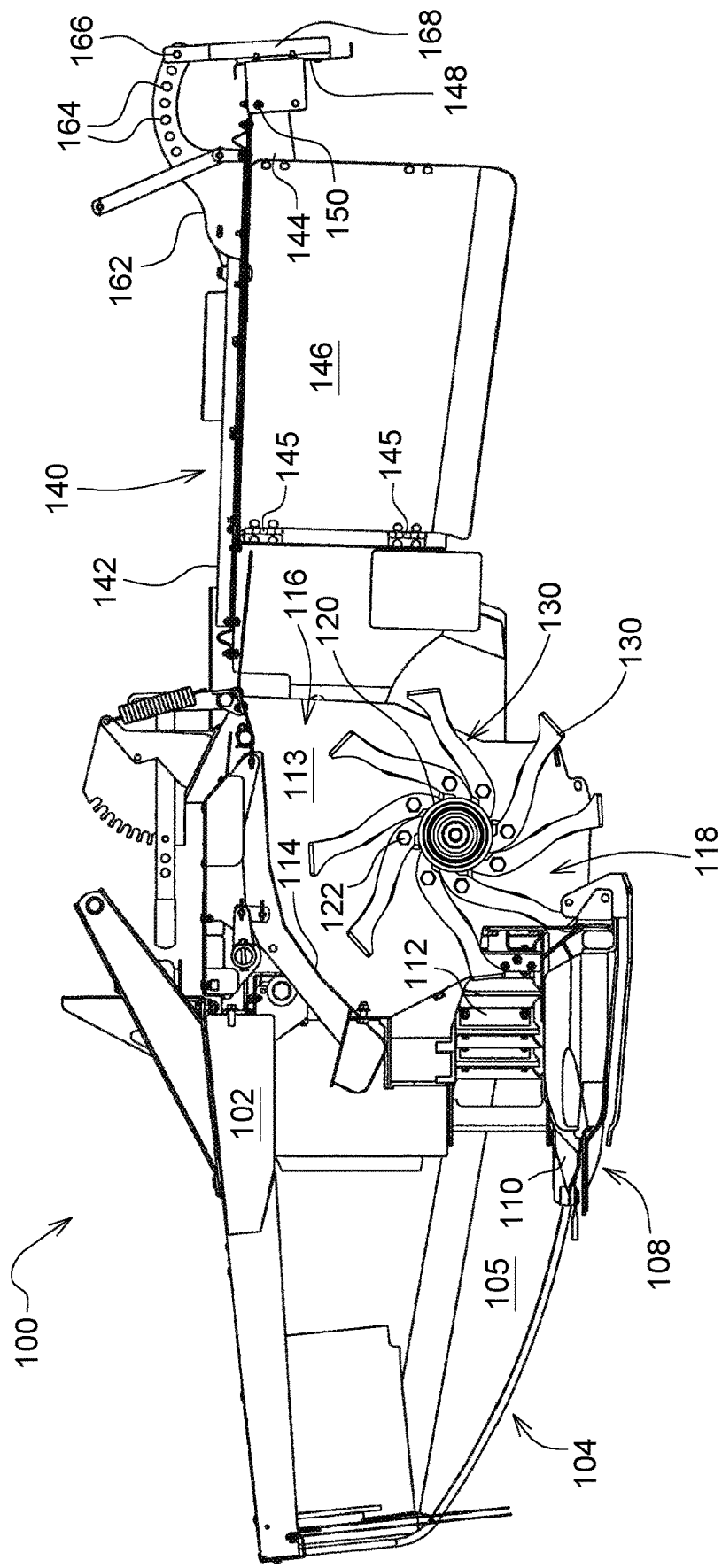
FIG. 1 is a right side cutaway view of a mower-conditioner header is shown according to an embodiment.

Embodiments of the present disclosure relates to a tine device having a generally curved configuration that is designed for coupling to a rotor of an impeller apparatus arranged in a mower-conditioner. Referring to FIG. 1, a mower-conditioner header 100 is shown. The mower-conditioner header 100 includes a frame 102 supporting a housing 104 having opposite sides walls 105. A rotary cutter bar 108 extends transversely between the sides walls 105 and includes a plurality of rotary cutting units 110 mounted along the length of the cutter bar 108 in side-by-side relationship to each other. Located for rotation with outer end ones of the cutting units 110 is an outer crop converging drum 112. The converging drum 112 cooperates with the cutting units 110 to deliver cut crop to a discharge opening leading to an impeller housing 116 including opposite sides walls 113 and an arched rotor hood 114. Extending between, and mounted for rotation in, the sides walls 113 is an impeller 118 including a central rotor 120 defined by a cylindrical tube carrying a plurality of tine clips 122 (i.e., coupling mechanisms) to which a plurality of tine devices 130 are respectively pivotally mounted by pivot assemblies. Each of the coupling mechanisms 122 includes a spacer 264 sized to axially position each respective pair of tine devices relative to each other. The rotor hood 114 is spaced approximately concentric to a segment of the impeller 118 extending between ten and one o'clock positions of a circular path described by the outer periphery of the tine devices 130 during rotation of the impeller 118.

Joined to and extending to the rear from the impeller housing 116 is a forming shield arrangement 140 including a horizontal top wall 142 and opposite, rearwardly converging side walls. A generally rectangular, vertical crop deflecting panel 146 having a forward edge hinged, as at 145 (FIG. 2), for establishing a vertical pivot axis about which the deflecting panel 146 may be pivoted.

For deflecting crop to one side or the other of a vertical plane extending in the direction of operation of the mower-conditioner header 100 and passing through a longitudinal center location of the mower-conditioner header 100, the panels are disposed parallel to each other and inclined one way or the other relative to the vertical plane. Crop may be converged by the panels 146 by disposing the panels 146 so that they converge rearwardly. A rear panel 148 is mounted, as by transverse pins 150, to a rear end of the side wall 144 for pivoting vertically about a horizontal transverse axis defined by the pins 150. An arcuate fore-and-aft extending bracket 162 is provided at a central, rear location of the top wall 142 and contains a plurality of adjustment holes 164 for selectively receiving a coupling pin 166 for securing a connecting bracket 168 of the panel 148 to a desired adjustment hole 164 so that the rear panel is positioned in a desired position for deflecting crop toward the ground.

Figure 2A:
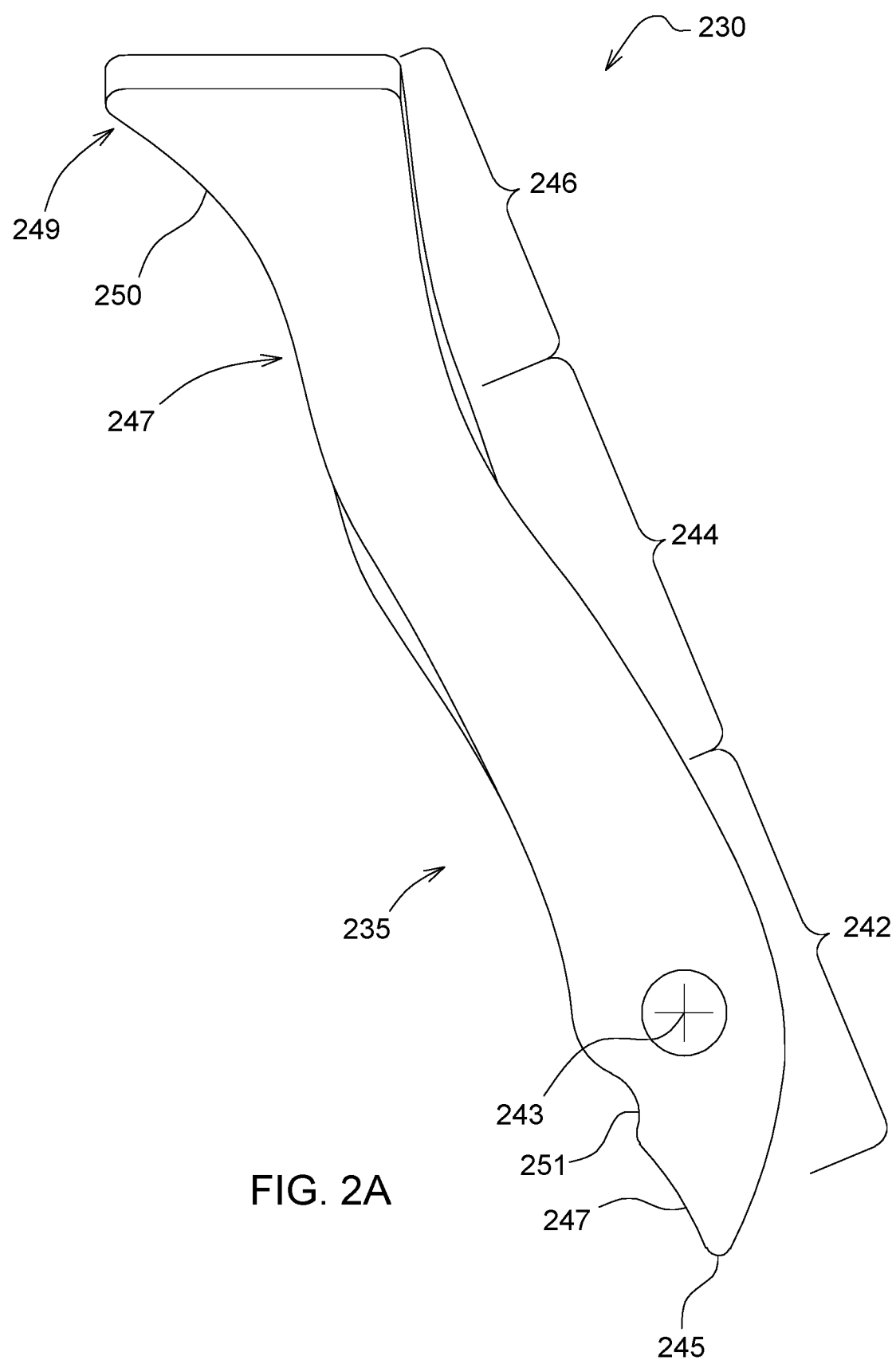
FIG. 2A is a side view of a tine element of a tine device according to an embodiment.
Figure 2B:
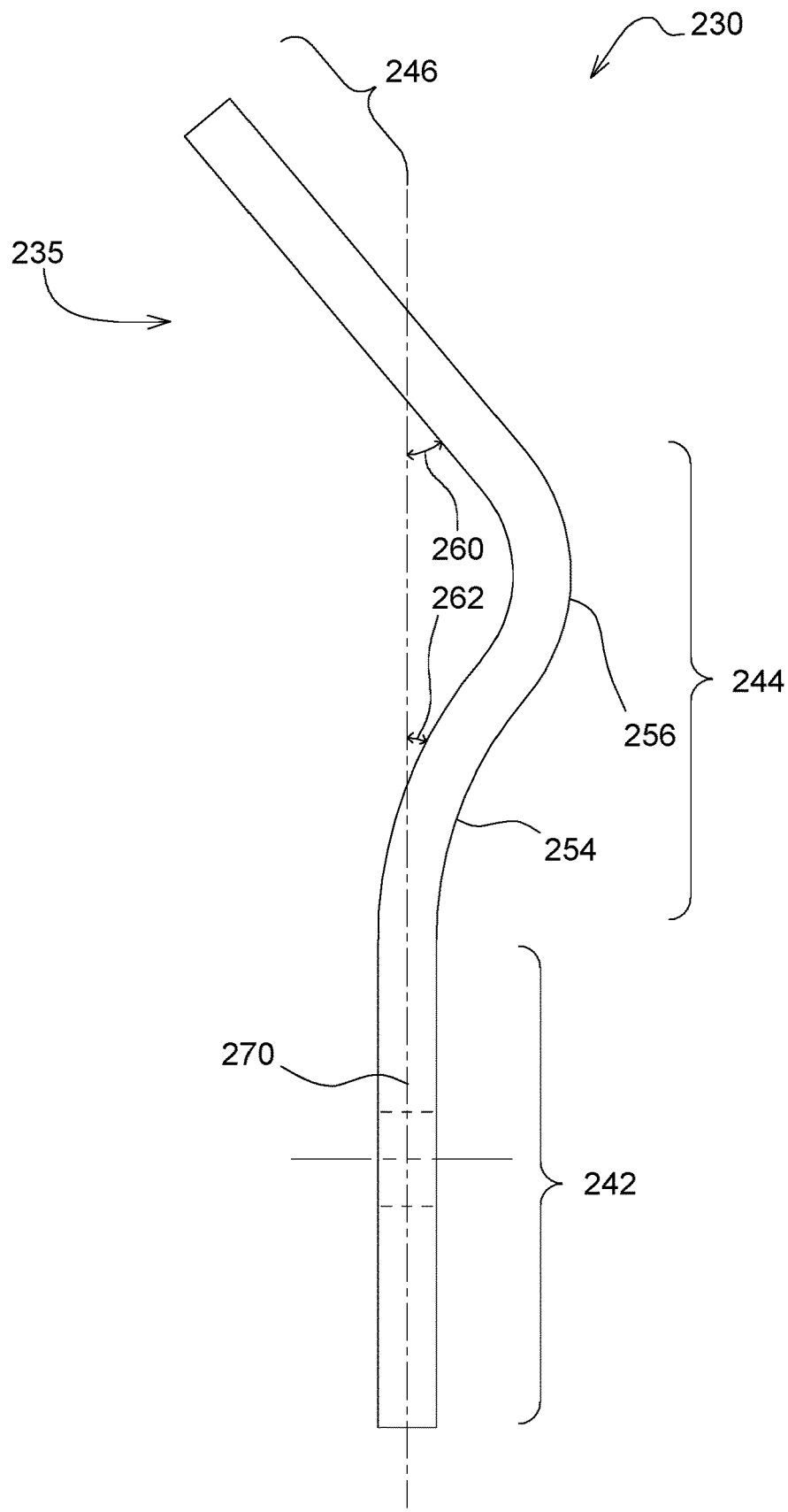
FIG. 2B is a front view of the tine element of FIG. 2A according to an embodiment.
Figure 2C:
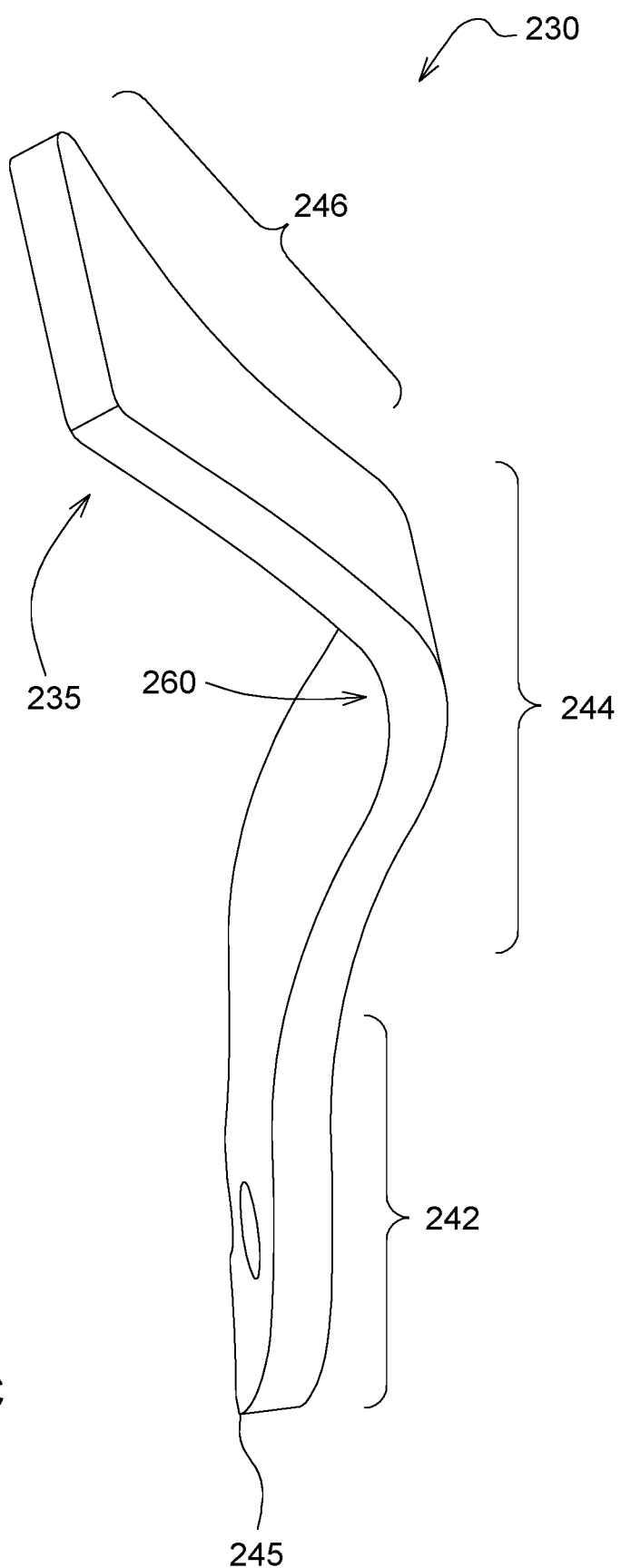
FIG. 2C is a front perspective view of the tine element of FIG. 2A according to an embodiment.

Referring to FIGS. 2A-2C and 3A-3B, a tine device 130 arranged for coupling to a rotor of an impeller apparatus is shown according to an embodiment. In embodiments, the tine device 130 can comprise at least two tine elements, for example, a first tine element 230a, and a second tine element 230b which are arranged in opposed parallel relation to one another (refer, e.g., to FIG. 3B). As depicted in FIGS. 2A-2C, each tine element 230a, 230b can comprise a body member 235 having a first end portion 242 joined together with a second end portion 246 by an arcuate member 244. The arcuate member 244 may alternatively be referred to as a curved portion. In various embodiments, the body member 235 can comprise a generally high strength and rigid material such as, e.g., stainless steel.

The second end portion 246 can comprise a generally tapered configuration that tapers outwardly from a lower end 247 to an upper end 249. In some embodiments, at least one outer wall surface can comprise a generally curved configuration such as outer wall surface 250.

The arcuate member 244 can comprise a first arcuate element 254 integrally formed with a second arcuate element 256. In some embodiments, the first arcuate element 254 can be arranged to form a first bend angle 262 relative to a center axis 270 of the body member 235, and the second arcuate element 256 can be arranged to form a second bend angle 260 relative to the center axis 270 that is greater than the first bend angle 262.

For example, the angular orientations of the first and second arcuate elements 254, 256 relative to one another are such that the body member 235 has a first bend toward the positive lateral direction of the body member 235, and a second bend toward the opposite (negative lateral) direction of the body member 235. Additionally, as depicted in FIGS. 2A and 2B, the relative arrangement of the first and second arcuate elements 254, 256 relative to one another causes at least a portion of the second end portion 246 to project outwardly and away from the center axis 270 of the body member 235. Further, it should be noted that such features (i.e., the angular orientations/bend of the body member 235) can be used to balance mass about the centerline of the tine device profile when the at least two tine elements 230a, 230b are assembled together. For example, the tine device 130 will have a center of mass lying on its vertical axis and thus, will not provide excessive fatigue to the pin due to side loading throughout its life and will still maintain its curved structure to allow for crop engagement off the back of the cutter bar (refer, e.g., to FIG. 1).

In some embodiments, the first end portion 242 can comprise at least one mounting aperture 243 that is sized to receive and accommodate one or more of the tine clips 122 arranged on the rotor 120. A lower end 241 of the first end portion 242 can comprise a generally pointed tip 245 having a recessed member 251 that is adapted for mating engaging with an outer of each tine clips 122.

Figure 3B:
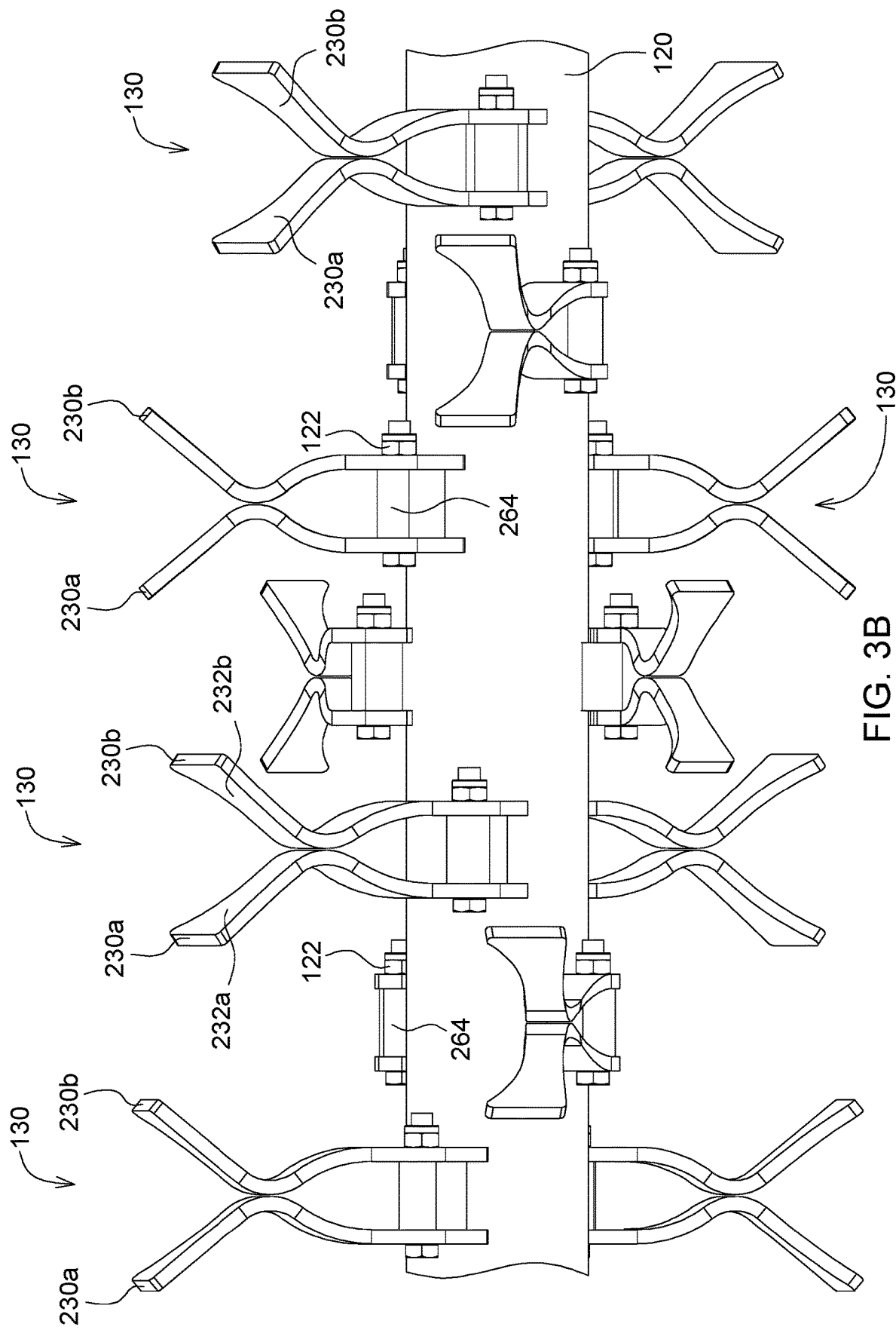
FIG. 3B is a side view of the impeller apparatus of FIG. 3A according to an embodiment.

In FIGS. 3A and 3B, a plurality of fully assembled tine devices 130 mounted to the rotor 120 of the impeller apparatus are shown according to an embodiment. As previously discussed the tine elements 230a, 230b are arranged in opposed relation to one another. Upon coupling, the tine elements 230a, 230b are positioned such that the second end portions 246 of each tine element 230a, 230 face opposing directions. In such an arrangement, a generally v-shaped opening is formed between the lateral spacing areas of the second end portions 246, with the arcuate members 244 of the first tine element 230a and the second tine element 230b contacting each other. The spacer 264 of each respective coupling mechanism 122 is disposed between and positions the first end portion 242 of the first tine element 230a and the first end portion 242 of the second tine element 230b relative to each other in a spaced axial relationship so that the arcuate members 244 of the first tine element 230a and the second tine element 230b contact each other. Similarly, each of the second end portions 246 can also be arranged to face opposing directions and laterally spaced apart from one another by a predetermined distance. Further, upon mounting to the rotor 120, each of the plurality of tine devices 130 can be adjacently arranged in offset relation relative to one another such that each projects outwardly and away from an outer surface of the rotor 120.

Without in any way limiting the scope, interpretation, or application of the claims appearing below, a technical effect of one or more of the example embodiments disclosed herein is a tine device for an impeller apparatus. The shape of the tine device is particularly advantageous and unique in that it provides an angle to incoming crop from a cutter bar and thus feeds better than a straight tine. Additionally, the tine device provides for a cost efficient solution to conventional approaches because it does not require expensive processes such as casting or welding in order to obtain its bend angle.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A tine device for an impeller apparatus arranged in an agricultural mower-conditioner, the tine device comprising:
    a first tine element and a second tine element arranged in an opposed and mirrored parallel relation to each other, wherein each of the first tine element and the second tine element include:
        a first end portion defining a radial line extending through the first end portion;
        a second end portion having an upper end positioned on a first side of the radial line; and
        a curved portion disposed between the first end portion and the second end portion and located on an opposite second side of the radial line relative to the upper end;
    a coupling mechanism interconnecting the first end portion of the first tine element and the first end portion of the second tine element; and
    wherein the coupling mechanism includes a spacer disposed between and positioning the first end portion of the first tine element and the first end portion of the second tine element relative to each other in a spaced axial relationship with the curved portion of the first tine element and the curved portion of the second tine element disposed in contacting engagement with each other.

2. The tine device of claim 1 further comprising at least one mounting aperture formed in the first end portion of each respective first tine element and second tine element, wherein the at least one mounting aperture is sized to receive and accommodate the coupling mechanism.

3. The tine device of claim 1, wherein the curved portion comprises a first arcuate element and a second arcuate element.

4. The tine device of claim 3, wherein the first arcuate element and the second arcuate element are arranged to respectively form a first bend angle and a second bend angle, and wherein the second bend angle is greater than the first bend angle.

5. The tine device of claim 1, wherein the second end is sized generally larger than the first end of the at least one tine element.

6. The tine device of claim 1, wherein the first tine element and the second tine element are balanced about a radial centerline.

7. An impeller apparatus arranged in an agricultural mower-conditioner, the impeller apparatus comprising:
    a rotor;
    a plurality of coupling mechanisms arranged on the rotor; and a plurality of tine devices, wherein each of the plurality of tine devices includes a first tine element and a second tine element arranged in an opposed and mirrored parallel relation to each other, wherein each of the first tine element and the second tine element include:
- a first end portion rotatably coupled to the rotor via a respective one of the plurality of coupling mechanisms;
- a second end portion having an upper end positioned on a first side of a radial line extending through the first end portion; and
- a curved portion located on an opposite second side of the radial line and disposed between the first end portion and the second end portion;

wherein the coupling mechanism includes a spacer disposed between and positioning the first end portion of the first tine element and the first end portion of the second tine element relative to each other in a spaced axial relationship with the curved portion of the first tine element and the curved portion of the second tine element of each of the plurality of tine devices disposed in contacting engagement with each other.

8. The impeller apparatus of claim 7, wherein the plurality of tine devices project outwardly and away from an outer surface of the rotor.

9. The impeller apparatus of claim 8, wherein each of the plurality of tine devices is adjacently arranged in offset relation relative to one another.

10. The impeller apparatus of claim 7, wherein the rotor comprises a generally tubular configuration and is centrally arranged in the impeller apparatus.

11. The impeller apparatus of claim 7 further comprising at least one mounting aperture formed in the first end portion of each of the first tine element and the second tine element, wherein the at least one mounting aperture is sized to receive and accommodate one or more coupling mechanisms.

12. The impeller apparatus of claim 7, wherein the curved portion comprises a first arcuate element and a second arcuate element.

13. The impeller apparatus of claim 12, wherein the first arcuate element and the second arcuate element are arranged to respectively form a first bend angle and a second bend angle, and wherein the second bend angle is greater than the first bend angle.

14. The impeller apparatus of claim 7, wherein the second end is sized generally larger than the first end of the at least one tine element.

15. The impeller apparatus of claim 7, wherein the first tine element and the second tine element of each of the plurality of tine devices is balanced about a respective radial centerline of each respective tine device.

* * * * *